United States Patent
Nashiki et al.

(10) Patent No.: US 7,348,649 B2
(45) Date of Patent: Mar. 25, 2008

(54) TRANSPARENT CONDUCTIVE FILM

(75) Inventors: Tomotake Nashiki, Osaka (JP); Hideo Sugawara, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 400 days.

(21) Appl. No.: 11/141,009

(22) Filed: Jun. 1, 2005

(65) Prior Publication Data

US 2005/0269707 A1    Dec. 8, 2005

(30) Foreign Application Priority Data

Jun. 3, 2004  (JP) .......................... P.2004-165802
Feb. 8, 2005  (JP) .......................... P.2005-031577

(51) Int. Cl.
  *H01L 27/14*  (2006.01)
  *H01L 31/00*  (2006.01)
(52) U.S. Cl. ................. 257/431; 257/449; 257/E31.126
(58) Field of Classification Search ................. 257/431, 257/432, 437, 449, E31.126, E33.064
See application file for complete search history.

(56) References Cited

U.S. PATENT DOCUMENTS 6,657,271 B2 * 12/2003  Katsuragawa ............... 257/437

FOREIGN PATENT DOCUMENTS

| JP | 02-066809 | 3/1990 |
|---|---|---|
| JP | 6-222352 A | 8/1994 |
| JP | 10-330916 | 12/1998 |
| JP | 2000-81952 | 3/2000 |
| JP | 2002-326301 | 11/2002 |

OTHER PUBLICATIONS

Office Action of Corresponding Chinese Patent Application 2005-10076019.5 issued Dec. 15, 2006.

* cited by examiner

*Primary Examiner*—Hoai v Pham
(74) *Attorney, Agent, or Firm*—Westerman, Hattori, Daniels & Adrian, LLP.

(57) ABSTRACT

The present invention provides a transparent conductive film having: a transparent base film; a transparent $SiO_x$ thin film having a thickness of from 10 to 100 nm, a refractive index of from 1.40 to 1.80 and an average surface roughness Ra of from 0.8 to 3.0 nm, wherein x is from 1.0 to 2.0; and a transparent conductive thin film including an indium-tin complex oxide, which has a thickness of from 20 to 35 nm and a ratio of $SnO_2/(In_2O_3+SnO_2)$ of from 3 to 15 wt %, wherein the transparent conductive thin film is disposed on one side of the transparent base film through the transparent $SiO_x$ thin film.

5 Claims, 1 Drawing Sheet

TRANSPARENT CONDUCTIVE FILM

FIELD OF THE INVENTION

The present invention relates to a transparent conductive film having a transparent base film for use in a touch panel, a method for producing the transparent conductive film and a touch panel having the transparent conductive film.

BACKGROUND OF THE INVENTION

Thin films transparent for a light in the visible light region and having electric conductivity are generally used in display systems, e.g., a liquid crystal display and an electroluminescence display, transparent electrodes, e.g., a touch panel, and for the static prevention and cutoff of electromagnetic waves of transparent articles. As such a transparent conductive thin film, so-called conductive glass comprising a glass plate having formed thereon an indium oxide thin film is conventionally used. However, since glass is used as a base, the conductive glass is inferior in flexibility and processability and cannot be used in some cases according to uses.

Therefore, in recent years, conductive thin films using various kinds of plastic films including polyethylene terephthalate as the base are used for various advantages, e.g., flexibility, processability, impact resistance and light weight (refer to reference 1 and 2).

However, these kinds of conductive thin films are great in the reflectance of light of the thin film surface, so that they are inferior in transparency, resistance to scratch and bending, and susceptible to scratch during use to thereby increase electric resistance or disconnection of wires, and also inferior in environment resistance at high temperature and high humidity. In particular, in recent years, a market for the touch panels to be used on a smart phone and a car navigator is growing, and the improvement in environment resistance at high temperature and high humidity is strongly desired.

The present inventors have proposed to obtain a transparent conductive laminate improved in transparency, scratch resistance and bending resistance by forming a transparent dielectric thin film such as an $SiO_2$ thin film, on one side of a transparent base film, and a transparent conductive thin film comprising an indium-tin complex oxide, on the $SiO_2$ thin film, and laminating a transparent substrate on the opposite side of the transparent base film via an adhesive layer (refer to reference 3). However, the improvement of environment resistance at high temperature and high humidity is still insufficient with the transparent conductive laminate.

It is effective to increase the thickness of the transparent conductive thin film provided on a transparent base film for improving the environment resistance. However, when the film thickness is increased, the surface resistance of the transparent conductive laminate lowers, so that a surface resistivity suitable for a touch panel cannot be obtained.

[Reference 1] JP 10-330916 A

[Reference 2] JP 2000-81952 A

[Reference 3] JP 2002-326301 A

In consideration of the existing state of things, an object of the invention is to provide a transparent conductive film having a surface resistivity suitable for use such as touch panels and excellent in reliability in high temperature high humidity environment, that is, excellent in humidity and heat resistance.

SUMMARY OF THE INVENTION

The present inventors have made eager investigation to examine the problem. As a result, it has been found, in regard to obtaining a transparent conductive film that is transparent and improved in scratch resistance and bending resistance by forming a transparent $SiO_x$ thin film, especially a transparent $SiO_2$ thin film, on one side of a transparent base film and a transparent conductive thin film comprising an indium-tin complex oxide on the transparent $SiO_x$ thin film that when the transparent $SiO_x$ thin film is formed by a dry thin film forming method (i.e., a dry process) such as a vacuum deposition method, a sputtering method and an ion plating method, the surface of the transparent $SiO_x$ thin film is roughened, which results in high surface resistance in the obtained conductive thin film in the wake of the roughness of the transparent $SiO_x$ thin film, compared with a film formation by a wet coating method (i.e., a wet process) such as a sol-gel method, so that a high surface resistivity suitable for use such as touch panels can be obtained.

It was also found, in regard to forming a surface roughened $SiO_x$ thin film and then a transparent conductive thin film comprising an indium-tin complex oxide, that when the content of $SnO_2$ in the complex oxide is set at a rather greater amount, a good result of humidity and heat resistance of the transparent conductive film can be obtained, so that the reliability at high temperature high humidity can be largely improved.

As a result of further experiments and investigations on the basis of the knowledge, the present invention has been achieved. The present invention is mainly directed to the following items:

1. A transparent conductive film comprising: a transparent base film; a transparent $SiO_x$ thin film having a thickness of from 10 to 100 nm, a refractive index of from 1.40 to 1.80 and an average surface roughness Ra of from 0.8 to 3.0 nm, wherein x is from 1.0 to 2.0; and a transparent conductive thin film comprising an indium-tin complex oxide, which has a thickness of from 20 to 35 nm and a ratio of $SnO_2/(In_2O_3+SnO_2)$ of from 3 to 15 wt %, wherein the transparent conductive thin film is disposed on one side of the transparent base film through the transparent $SiO_x$ thin film.

2. The transparent conductive film according to item 1, wherein the transparent conductive film has a surface having a surface resistivity of from 250 to 500 Ω/□, wherein the transparent conductive film has a rate of change of the surface resistivity after being allowed to stand at 85° C. and 85% RH for 500 to 1,000 hours of from 1.5 or less.

3. The transparent conductive film according to item 1, wherein the transparent base film has a thickness of from 2 to 200 μm.

4. The transparent conductive film according to item 3, which further comprises: a transparent adhesive layer; and a transparent substrate disposed on the other side of the transparent base film, which is opposite to the side on which the transparent conductive thin film is disposed, through the transparent adhesive layer.

5. A touch panel comprising a pair of panel plates each having a conductive thin film, which is arranged through a spacer so that the conductive thin films face each other, wherein at least one panel of the pair of panel plates is a transparent conductive film according to item 1.

6. A method for producing a transparent conductive film, which comprises: forming a transparent $SiO_x$ thin film on a surface of a transparent base film by a dry thin film forming method; and forming a transparent conductive thin film comprising an indium-tin complex oxide on the transparent $SiO_x$ thin film, wherein the transparent $SiO_x$ thin film has a thickness of from 10 to 100 nm, a refractive index of from 1.40 to 1.80 and an average surface roughness Ra of from 0.8 to 3.0 nm, wherein x is from 1.0 to 2.0, wherein the transparent conductive thin film has a thickness of from 20 to 35 nm and a ratio of $SnO_2/(In_2O_3+SnO_2)$ of from 3 to 15 wt %.

7. The method for producing a transparent conductive film according to item 6, wherein the dry thin film forming method is one of a vacuum deposition method, a sputtering method and an ion plating method.

In the present invention, a ratio of $SnO_2/(In_2O_3+SnO_2)$ means a ratio (wt %) of a weight of a tin oxide (i.e., $SnO_2$) to a total weight of the tin oxide and an indium oxide (i.e., $In_2O_3$).

In the present invention, a transparent $SiO_x$ thin film means a transparent thin film consisting of $SiO_x$.

DETAILED DESCRIPTION OF THE INVENTION

Figure 1:
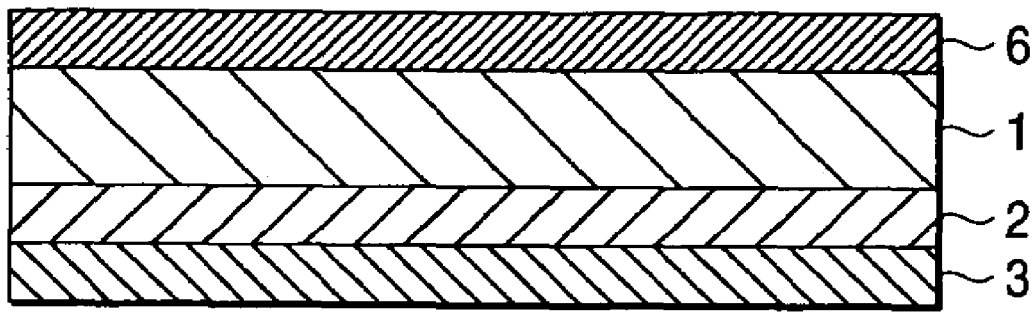
FIG. 1 is a cross sectional view showing an example of a transparent conductive film in accordance with the present invention.

The materials of the transparent base film in the present invention are not particularly restricted. Examples thereof include polyester resins, acetate resins, polyether sulfone resins, polycarbonate resins, polyamide resins, polyimide resins, polyolefin resins, polyvinyl chloride resins, polystyrene resins, polyvinyl alcohol resins, polyallylate resins, polyphenylene sulfide resins, polyvinylidene chloride resins, and (meth)acrylic resins. Among them, polyester resins, polycarbonate resins and polyolefin resins are preferred.

As the transparent base film, a plastic film comprising the above material is preferred. The thickness thereof is preferably of from 2 to 200 μm. The thickness is preferably used from the aspects of transparency, scratch resistance and bending resistance in the case where the transparent base films are used for touch panels.

Further, the surface of a transparent base film may be previously subjected to treatment such as sputtering treatment, corona discharge treatment, flame treatment, ultraviolet ray irradiation, electron beam irradiation, conversion treatment, etching treatment such as oxidation, or undercoating treatment so as to improve the adhesion of the transparent base film and an $SiO_x$ thin film provided on the transparent base film. Alternatively, before providing the $SiO_x$ thin film, if necessary, the transparent base film may be subjected to dust removal or cleaning by washing with a solvent or ultrasonic wave washing.

In the present invention, an transparent $SiO_x$ thin film, wherein x is 1.0 to 2.0, is formed on one side of a transparent base film by a dry thin film forming method such as a vacuum deposition method, a sputtering method or an ion plating method. The $SiO_x$ thin film has a thickness of from 10 to 100 nm in view of the transparency, scratch resistance and bending resistance, and particularly preferably from 20 to 80 nm. The refractive index of light of the thin film is from 1.40 to 1.80 with respect to D-ray on the basis of the characteristics of the material of the thin film itself, by which good results can be obtained in characteristics such as transparency.

The $SiO_x$ thin film has an average surface roughness (Ra) of from 0.8 to 3.0 nm due to the employment of the dry thin film forming method, and particularly preferably from 1.0 to 2.5 nm. When the average surface roughness (Ra) is less than 0.8 nm, the surface unevenness becomes too small, and when a transparent conductive thin film comprising an indium-tin complex oxide is thickly formed on the $SiO_x$ thin film, the surface resistivity becomes too low. While when the average surface roughness (Ra) exceeds 3.0 nm, the surface unevenness becomes too large, so that a stable surface resistivity can be hardly obtained.

In the present invention, after such an $SiO_x$ thin film is formed on the transparent base film, a transparent conductive thin film comprising an indium-tin complex oxide is formed on the $SiO_x$ thin film. The transparent conductive thin films are formed by a dry thin film forming method. In the present invention, the dry thin film forming method is preferably one of a vacuum deposition method, a sputtering method and an ion plating method.

The transparent conductive thin film has a thickness of from 20 to 35 nm, particularly preferably from 25 to 30 nm. When the thickness is less than 20 nm, a continuous film is difficult to obtain and the surface resistivity is liable to become too high. On the other hand, when the thickness exceeds 35 nm, the reduction of transparency of the transparent conductive film is liable to be brought about.

In the present invention, a transparent conductive film preferably has a surface having a surface resistivity of from 250 to 500 Ω/□, and a rate of change of the surface resistivity after being allowed to stand at 85° C. and 85% RH for 500 to 1,000 hours of from 1.5 or less.

In the present invention, a rate of change of the surface resistivity after being allowed to stand at 85° C. and 85% RH for 500 to 1,000 hours means a ratio of a surface resistivity of a transparent conductive film after allowing to stand under 85° C. 85% RH for 500 to 1,000 hours to a surface resistivity thereof at the initial stage.

The transparent conductive thin film comprising an indium-tin complex oxide preferably has a ratio of $SnO_2/(In_2O_3+SnO_2)$ of from 3 to 15 wt %, particularly preferably from 5 to 10 wt %. When the ratio is less than 3 wt %, the surface resistivity becomes too high, and it is difficult to form a conductive thin film having good reproducibility, in addition, the humidity and heat resisting characteristics tend to deteriorate. Further, when the ratio exceeds 15 wt %, the crystallization of the conductive thin film becomes worse, which is liable to cause the reduction of transparency of the transparent conductive film and the reduction of film characteristics, e.g., electric conductivity.

As the material for forming such a conductive thin film, an indium-tin complex oxide having a ratio of $SnO_2/(In_2O_3+SnO_2)$ of the above proportion is generally used, but an indium-tin alloy capable of forming an indium-tin complex oxide having the above ratio by the oxidation reaction at the time of deposition or sputtering can also be used as the starting material.

Thus, the present invention provides a transparent conductive film comprising a transparent base film, in particular a transparent base film having a thickness of from 2 to 200 μm, and a transparent conductive thin film comprising an indium-tin complex oxide having a specific content of $SnO_2$ which is provided on one side of the transparent base film, via a transparent $SiO_x$ thin film having specific surface roughness.

The transparent conductive film can be used as it is in various uses such as a touch panel. Further, it is more preferred to laminate a transparent substrate on the other side of the transparent base film of the transparent conductive film, that is, the side opposite to the side on which the transparent conductive thin film is disposed, via a transparent adhesive layer.

In such a transparent conductive film, an adhesive layer may be provided on the side of a transparent substrate and the transparent base film-side of the transparent conductive film may be laminated on the adhesive layer, or in contrast with this, an adhesive layer may be provided on the transparent base film-side of the transparent conductive film, and a transparent substrate may be laminated on the adhesive layer. Formation of an adhesive layer can be performed continuously in the latter case, so that the latter case is more preferred in the aspect of productivity.

Adhesives having transparency can be used in the adhesive layer with no particular restriction. For example, acrylic adhesives, silicone adhesives and rubber adhesives are preferably used. The adhesive layer has a function of improving the scratch resistance and the touching characteristics for a touch panel of a conductive thin film by the cushioning effect after adhesion of a transparent substrate.

From the viewpoint of the better exhibition of these functions, it is preferred for an adhesive layer to have an elastic modulus of the range of from $1 \times 10^5$ to $1 \times 10^7$ dyn/cm². When the elastic modulus of an adhesive layer is less than $1 \times 10^5$ dyn/cm², the adhesive layer becomes inelastic and easily deforms by pressurization, as a result unevenness is caused in the transparent base film and further the conductive thin film. In addition, the adhesive is liable to be forced out from the processed cut plane and, further, the scratch resistance and the improving effect of touching characteristics for a touch panel of the conductive thin film are reduced. On the other hand, when the elastic modulus exceeds $1 \times 10^7$ dyn/cm², the adhesive layer hardens and the cushioning effect of the adhesive layer cannot be expected, thus the scratch resisting property and the touching characteristics for a touch panel of the conductive thin film cannot be improved.

Further, by the same reason as the above, it is preferred that the thickness of an adhesive layer is generally 1 μm or more, preferably from 5 to 100 μm. When the thickness of an adhesive layer is less than 1 μm, the cushioning effect of the adhesive layer cannot be also expected, so that the improvement of scratch resistance and the touching characteristics for a touch panel of the conductive thin film cannot be expected. While when the thickness is too great, transparency is impaired, and good results cannot be obtained in the points of adhesive layer formation, the workability of the lamination of a transparent substrate and manufacturing costs.

A transparent substrate laminated via such an adhesive layer is one providing good mechanical strength to the transparent base film, in particular contributing to the prevention of the occurrence of curling, and when flexibility is required after lamination of a substrate, plastic films having a thickness of from 6 to 300 μm are generally used, and when flexibility is not particularly required, glass plates or film-like or plate-like plastics having a thickness of from 0.05 to 10 mm are generally used. As the plastic materials, the same materials described as the transparent base film are exemplified.

If necessary, a transparent conductive film thus manufactured may be provided with an anti-glare layer and an anti-reflection layer for the purpose of improving visibility, and a hard coat-treated layer for the purpose of protecting the external surface, on the external surface of a transparent substrate (on the side opposite to an adhesive layer). As the hard coat processed layer, cured films comprising curing resins, e.g., melamine resins, urethane resins, alkyd resins, acrylic resins, and silicone resins are preferably used.

Further, the above anti-glare layer, anti-reflection layer and hard coat-treated layer can be directly provided on a transparent conductive film of a kind not laminated with a transparent substrate. That is, the thickness of a transparent base film is set at a possible thick value in the above thickness range and each of the above layers may be provided on the side of the transparent base film opposite to the side on which a conductive thin film is formed.

FIG. 1 is an example of a transparent conductive film in the present invention. Transparent conductive thin film 3 comprising an indium-tin complex oxide is provided on one side of transparent base film 1 via $SiO_x$ thin film 2, and hard coat-treated layer 6 is provided on the other side.

Figure 2:
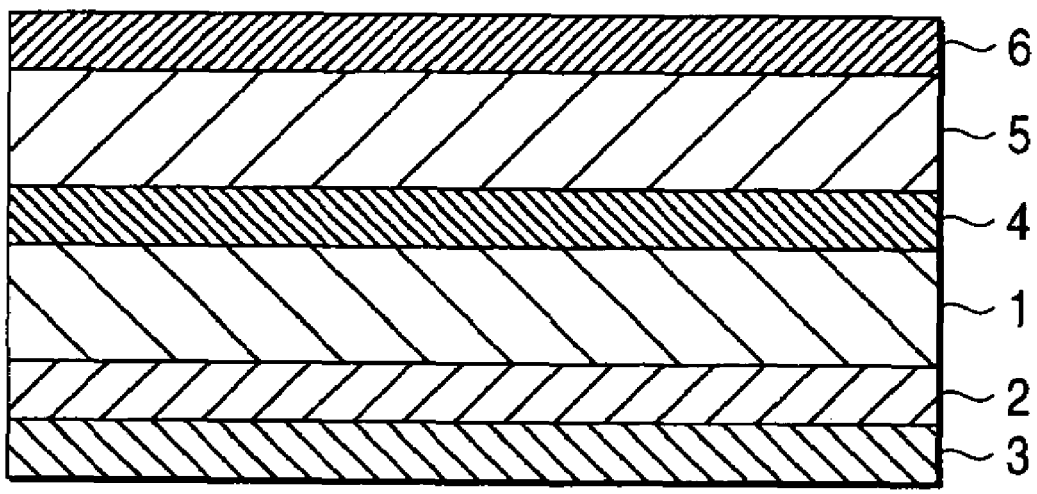
FIG. 2 is a cross sectional view showing other example of a transparent conductive film in accordance with the present invention.

FIG. 2 is an example of a transparent conductive film in the present invention. Transparent conductive thin film 3 comprising an indium-tin complex oxide is provided on one side of transparent base film 1 via $SiO_x$ thin film 2, transparent substrate 5 is laminated on the other side of transparent base film 1 via transparent adhesive layer 4, and hard coat-treated layer 6 is provided on the other side of transparent substrate 5.

In a touch panel comprising a pair of panel plates each having a conductive thin film arranged at counter positions via a spacer so that the conductive thin films counter to each other, by using, as at least either one panel, a transparent conductive film or a transparent conductive film having the constitution described above, particularly preferably the transparent conductive film further having a transparent substrate via a transparent adhesive, a touch panel excellent in humidity and heat resistance and excellent in reliability at high temperature and high humidity can be provided according to the present invention.

The transparent conductive film according to the present invention have a proper surface resistivity and excellent humidity and heat resistances, so that they can be applied to various uses where to be superior in environment resistance under high temperature and high humidity is desired.

EXAMPLES

The present invention is now illustrated in greater detail with reference to Examples and Comparative Examples, but it should be understood that the present invention is not to be construed as being limited thereto. In the examples "parts" means "parts by weight" unless otherwise indicated.

The refractive index of light of each thin film is a value measured with Abbe's refractometer. The average surface roughness of each $SiO_x$ thin film was measured with an atomic force microscope (AFM, Nanoscope IIIa+D3000, manufactured by Digital Instruments Corp.).

Example 1

Production of Transparent Conductive Film

On one side of a transparent base film of a polyethylene terephthalate (hereinafter referred to as "PET") film having a thickness of 25 μm, an $SiO_x$ (x=2.0) thin film having a thickness of 30 nm and a refractive index of light of 1.46 was formed by a vacuum deposition method. The average surface roughness of the $SiO_x$ thin film was 2.0 nm.

In the next place, a transparent conductive thin film comprising an indium-tin complex oxide (hereinafter referred to as an ITO thin film) having a thickness of 25 nm and a refractive index of light of 2.00 was formed on the $SiO_x$ thin film by using a sintered material including 95 wt % of indium oxide ($In_2O_3$) and 5 wt % of tin oxide ($SnO_2$) in the atmosphere of 80% of argon gas and 20% of oxygen gas at $4\times10^{-3}$ Torr by a reactive sputtering method, thereby a transparent conductive film was obtained.

Production of Hard Coat-Treated Film

A solution obtained by adding 5 parts of hydroxy-cyclohexyl phenyl ketone (Irgacure 184, manufactured by Ciba Specialty Chemicals Inc.) as a photopolymerization initiator to 100 parts of acryl-urethane resin (Unidic 17-806, manufactured by Dainippon Ink and Chemicals Inc.) and diluting with toluene to concentration of 50 wt % was coated on one side of a PET film having a thickness of 125 µm, dried at 100° C. for 3 minutes, and immediately subjected to UV irradiation with two ozone type high pressure mercury lamps (80 W/cm, 15 cm converging type) to form a hard coat-treated layer having a thickness of 5 µm, thereby a hard coat-treated film was obtained.

Production of Transparent Conductive Laminated Film

A transparent acrylic-based adhesive layer having an elastic modulus adjusted to $1\times10^6$ dyn/cm$^2$ (10 N/cm$^2$) (obtained by blending 1 part of an isocyanate crosslinking agent to 100 parts of acrylic copolymer including butyl acrylate, acrylic acid and vinyl acetate in weight ratio of 100/2/5) was formed in the thickness of about 20 µm on the opposite side to the hard coat-treated layer of the hard coat-treated film, and the transparent base film-side of the above transparent conductive film was laminated on the adhesive layer, thereby a transparent conductive film having a hard-coat treated transparent substrate (PET film) was obtained. Hereinafter, a transparent conductive film having a transparent substrate is referred to as a transparent conductive laminated film.

Production of Touch Panel

A touch panel as a switching body structure was manufactured, wherein the transparent conductive laminated film was used as a panel plate of one side and a glass plate on which an ITO thin film having a thickness of 30 nm was formed in the same manner as above was used as a panel plate of the other side, and both panel plates were arranged at counter positions via a spacer having a thickness of 10 µm so that ITO thin films countered to each other. Prior to counter position arrangement, each ITO thin film of both panel plates formed a silver electrode so as to be orthogonalized to each other.

Example 2

A transparent conductive film was manufactured in the same manner as in Example 1 except that the thickness of the ITO thin film was changed to 30 nm. A transparent conductive laminated film and a touch panel were manufactured with the transparent conductive film in the same manner as in Example 1.

Example 3

A transparent conductive film was manufactured in the same manner as in Example 1 except that a sintered material including 90 wt % of indium oxide and 10 wt % of tin oxide was used. A transparent conductive laminated film and a touch panel were manufactured with the transparent conductive film in the same manner as in Example 1.

Example 4

A transparent conductive film was manufactured in the same manner as in Example 3 except that the thickness of the ITO thin film was changed to 30 nm. A transparent conductive laminated film and a touch panel were manufactured with the transparent conductive film in the same manner as in Example 1.

Example 5

A transparent conductive film was manufactured in the same manner as in Example 1 except that a sintered material including 97 wt % of indium oxide and 3 wt % of tin oxide was used, and the thickness of the ITO thin film was changed to 30 nm. A transparent conductive laminated film and a touch panel were manufactured with the transparent conductive film in the same manner as in Example 1.

Example 6

A transparent conductive film was manufactured in the same manner as in Example 1 except that a sintered material including 97 wt % of indium oxide and 3 wt % of tin oxide was used, and the thickness of the ITO thin film was changed to 35 nm. A transparent conductive laminated film and a touch panel were manufactured with the transparent conductive film in the same manner as in Example 1.

Example 7

On one side of a transparent base film of a PET film having a thickness of 125 µm, an $SiO_x$ thin film and an ITO thin film were formed in this order in the same manner as in Example 3, and a hard coat-treated layer was formed on the other side in the same manner as in Example 1, thereby a transparent conductive film with a hard coat-treated layer was formed. A touch panel was manufactured with the transparent conductive film in the same manner as in Example 1.

Comparative Example 1

Silica sol (obtained by diluting COLCOAT P (manufactured by COLCOAT CO., LTD.) with ethanol in solid concentration of 2 wt %) was coated by a silica coating method on one side of a transparent base film of a PET film having a thickness of 25 µm, dried by heating at 150° C. for 2 minutes to be hardened, thereby an $SiO_x$ (x=2.0) thin film having a thickness of 30 nm and a refractive index of light of 1.44 was formed. The average surface roughness of the $SiO_x$ thin film was 0.5 nm.

An ITO thin film was formed on the $SiO_x$ thin film in the same manner as in Example 1, thereby a transparent conductive film was obtained. A transparent conductive laminated film and a touch panel were manufactured with the transparent conductive film in the same manner as in Example 1.

Comparative Example 2

An $SiO_x$ thin film was formed on one side of a transparent base film of a PET film having a thickness of 25 μm in the same manner as in Comparative Example 1, and then an ITO thin film was formed in the same manner as in Example 3, thereby a transparent conductive film was obtained. A transparent conductive laminated film and a touch panel were manufactured with the transparent conductive film in the same manner as in Example 1.

Comparative Example 3

An $SiO_x$ thin film was formed on one side of a transparent base film of a PET film having a thickness of 25 μm in the same manner as in Comparative Example 1, and then an ITO thin film was formed in the same manner as in Example 4, thereby a transparent conductive film was obtained. A transparent conductive laminated film and a touch panel were manufactured with the transparent conductive film in the same manner as in Example 1.

Comparative Example 4

An $SiO_x$ thin film was formed on one side of a transparent base film of a PET film having a thickness of 25 μm in the same manner as in Comparative Example 1, and then an ITO thin film was formed in the same manner as in Example 5, thereby a transparent conductive film was obtained. A transparent conductive laminated film and a touch panel were manufactured with the transparent conductive film in the same manner as in Example 1.

Comparative Example 5

An $SiO_x$ thin film was formed on one side of a transparent base film of a PET film having a thickness of 25 μm in the same manner as in Comparative Example 1, and then an ITO thin film having a thickness of 35 nm was formed by using a sintered material including 99 wt % of indium oxide and 1 wt % of tin oxide, thereby a transparent conductive film was obtained. A transparent conductive laminated film and a touch panel were manufactured with the transparent conductive film in the same manner as in Example 1.

Comparative Example 6

A transparent conductive film was manufactured in the same manner as in Example 1 except that an ITO thin film having a thickness of 35 nm was formed by using a sintered material including 99 wt % of indium oxide and 1 wt % of tin oxide. A transparent conductive laminated film and a touch panel were manufactured with the transparent conductive film in the same manner as in Example 1.

With each transparent conductive film prepared in Examples 1 to 7 and Comparative Examples 1 to 6, the film forming process, film thickness, refractive index and average surface roughness of the $SiO_x$ thin film, and the content of tin oxide ($SnO_2$) and film thickness of the ITO thin film are summarized in Table 1 below. In Table 1, "dry process" in the column of film forming process is a vacuum deposition process and "wet process" is a silica coating process.

TABLE 1

| | | SiOx Thin Film | | | ITO Thin Film | |
|---|---|---|---|---|---|---|
| Example No. | Film Forming Process | Thickness (nm) | Refractive Index | Average Surface Roughness (nm) | Amount of $SnO_2$ (wt %) | Thickness (nm) |
| Example 1 | Dry process | 30 | 1.46 | 2.0 | 5 | 25 |
| Example 2 | Dry process | 30 | 1.46 | 2.0 | 5 | 30 |
| Example 3 | Dry process | 30 | 1.46 | 2.0 | 10 | 25 |
| Example 4 | Dry process | 30 | 1.46 | 2.0 | 10 | 30 |
| Example 5 | Dry process | 30 | 1.46 | 2.0 | 3 | 30 |
| Example 6 | Dry process | 30 | 1.46 | 2.0 | 3 | 35 |
| Example 7 | Dry process | 30 | 1.46 | 2.0 | 10 | 25 |
| Comparative Example 1 | Wet process | 30 | 1.44 | 0.5 | 5 | 25 |
| Comparative Example 2 | Wet process | 30 | 1.44 | 0.5 | 10 | 25 |
| Comparative Example 3 | Wet process | 30 | 1.44 | 0.5 | 10 | 30 |
| Comparative Example 4 | Wet process | 30 | 1.44 | 0.5 | 3 | 30 |
| Comparative Example 5 | Wet process | 30 | 1.44 | 0.5 | 1 | 35 |
| Comparative Example 6 | Dry process | 30 | 1.46 | 2.0 | 1 | 35 |

With each transparent conductive laminated film manufactured in Examples 1 to 7 and Comparative Examples 1 to 6 (the sample in Example 7 was a transparent conductive film with a hard coat-treated layer), surface resistivity (Ω/□) of the transparent conductive thin film-side of the transparent conductive film was measured with a two-point probe method. Further, the light transmittance and humidity and heat resistance of each sample were measured according to the following methods. The results obtained are shown in Table 2 below.

Light Transmittance

A visible light transmittance at the wavelength of light of 550 nm was measured with a spectral analyzer UV-240, manufactured by Shimadzu Corporation.

Humidity and Heat Resistance

An ITO thin film was completely crystallized by heat processing at 150° C. for 1 hour, and the surface resistivity $R_0$ at the initial stage was measured. In the next place, the surface resistivity $R_{500}$ after the ITO thin film was allowed to stand under 85° C. 85% RH for 500 hours and the surface resistivity $R_{1000}$ after being allowed to stand for 1,000 hours were measured. $R_{500}/R_0$ and $R_{1000}/R_0$ were searched for as the rate of change of the resistivity, and humidity and heat resistance was evaluated from these values.

TABLE 2

| Example No. | Surface Resistivity (Ω/□) | Light Transmittance (%) | Moisture and Heat Resistance | |
|---|---|---|---|---|
| | | | $R_{500}/R_0$ | $R_{1000}/R_0$ |
| Example 1 | 350 | 90 | 1.3 | 1.5 |
| Example 2 | 300 | 89 | 1.2 | 1.4 |
| Example 3 | 350 | 89 | 1.2 | 1.3 |
| Example 4 | 300 | 88 | 1.1 | 1.1 |
| Example 5 | 400 | 89 | 1.3 | 1.5 |
| Example 6 | 350 | 88 | 1.2 | 1.4 |
| Example 7 | 350 | 89 | 1.2 | 1.3 |
| Comparative Example 1 | 180 | 90 | 1.3 | 1.5 |
| Comparative Example 2 | 170 | 89 | 1.2 | 1.3 |
| Comparative Example 3 | 130 | 88 | 1.1 | 1.1 |
| Comparative Example 4 | 190 | 88 | 1.3 | 1.5 |
| Comparative Example 5 | 350 | 88 | 1.7 | 2.7 |
| Comparative Example 6 | 450 | 88 | 1.8 | 3.0 |

From the results in Table 2, it is known that the surface resistivity of each transparent conductive laminated film in Examples 1 to 7 (the sample in Example 7 is a transparent conductive film with a hard coat-treated layer) is in the range of from 250 to 500 Ω/□ that is suitable for a touch panel, and $R_{500}/R_0$ is in the range of from 1.1 to 1.3, and $R_{1000}/R_0$ is in the range of from 1.1 to 1.5, so that every sample is excellent in humidity and heat resistance.

Contrary to this, the surface resistivitys of transparent conductive laminated films in Comparative Examples 1 to 4 in which the $SiO_x$ thin film was formed by a silica coating process are as low as 190 Ω/□ or less. In Comparative Examples 5 and 6, wherein the content of $SnO_2$ in the ITO thin films is low, $R_{500}/R_0$ is in the range of from 1.7 to 1.8, and $R_{1000}/R_0$ is in the range of from 2.7 to 3.0, so that these samples are apparently inferior in humidity and heat resistance.

Thus, in the present invention, a transparent conductive film, which comprises a surface roughened $SiO_x$ thin film on a transparent base film and a transparent conductive thin film comprising an indium-tin complex oxide having a specific content of $SnO_2$ on the $SiO_x$ thin film, having a high surface resistivity suitable for use such as touch panels and an excellent humidity and temperature resistance can be obtained. By using the transparent conductive film, a touch panel having high humidity and temperature resistances required in smart phones and car navigators can be provided.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2004-165802 filed on Jun. 3, 2004 and No. 2005-031557 filed on Feb. 8, 2005 the contents thereof are incorporated herein by reference.

What is claimed is:

1. A transparent conductive film comprising:
   a transparent base film;
   a transparent $SiO_x$ thin film having a thickness of from 10 to 100 nm, a refractive index of from 1.40 to 1.80 and an average surface roughness Ra of from 0.8 to 3.0 nm, wherein x is from 1.0 to 2.0; and
   a transparent conductive thin film comprising an indium-tin complex oxide, which has a thickness of from 20 to 35 nm and a ratio of $SnO_2/(In_2O_3 + SnO_2)$ of from 3 to 15 wt %, wherein the transparent conductive thin film is disposed on one side of the transparent base film through the transparent $SiO_x$ thin film.

2. The transparent conductive film according to claim 1, wherein the transparent conductive film has a surface having a surface resistivity of from 250 to 500 Ω/□, wherein the transparent conductive film has a rate of change of the surface resistivity after being allowed to stand at 85° C. and 85% RH for 500 to 1,000 hours of from 1.5 or less.

3. The transparent conductive film according to claim 1, wherein the transparent base film has a thickness of from 2 to 200 μm.

4. The transparent conductive film according to claim 3, which further comprises:
   a transparent adhesive layer; and
   a transparent substrate disposed on the other side of the transparent base film, which is opposite to the side on which the transparent conductive thin film is disposed, through the transparent adhesive layer.

5. A touch panel comprising a pair of panel plates each having a conductive thin film, which is arranged through a spacer so that the conductive thin films face each other, wherein at least one panel of the pair of panel plates is a transparent conductive film according to claim 1.

* * * * *